(12) United States Patent
Kim et al.

(10) Patent No.: US 7,294,179 B2
(45) Date of Patent: Nov. 13, 2007

(54) CANISTER OF VEHICLE

(75) Inventors: Eui Sik Kim, Suwon (KR); Chun Kyu Park, Seoul (KR)

(73) Assignee: Kia Motors Corporation and Hyundai Motor Company, Seoul (KR)

( * ) Notice: Subject to any disclaimer, the term of this patent is extended or adjusted under 35 U.S.C. 154(b) by 442 days.

(21) Appl. No.: 11/022,229

(22) Filed: Dec. 23, 2004

(65) Prior Publication Data

US 2005/0139068 A1 Jun. 30, 2005

(30) Foreign Application Priority Data

Dec. 30, 2003 (KR) .................. 10-2003-0099873
Mar. 31, 2004 (KR) .................. 10-2004-0022017

(51) Int. Cl.
*B01D 53/02* (2006.01)

(52) U.S. Cl. .................. 96/121; 96/131; 96/152; 55/418; 123/519

(58) Field of Classification Search .................. 96/121, 96/131, 152; 123/519; 55/410, 418, 482
See application file for complete search history.

(56) References Cited

U.S. PATENT DOCUMENTS 6,279,548 B1 * 8/2001 Reddy .................. 123/520
6,874,483 B2 * 4/2005 Zuchara .................. 123/519

* cited by examiner

*Primary Examiner*—Robert A. Hopkins
(74) *Attorney, Agent, or Firm*—Morgan Lewis & Bockius LLP

(57) ABSTRACT

Two types of activated charcoals having different adsorption and desorption functions are appropriately disposed in a canister. Gas movement is evenly dispersed via an air space and diffuser equipped between the two activated charcoals. Thereby, leakage of fuel vapor from the canister to the atmosphere is minimized without implementing a supplementary component (e.g., a subsidiary canister), and reduction of the consumption amount of the activated charcoal by eliminating a dead volume.

6 Claims, 4 Drawing Sheets

DEAD VOLUME          DEAD VOLUME

DEAD VOLUME    DEAD VOLUME

CANISTER OF VEHICLE

CROSS-REFERENCE TO RELATED APPLICATION(S)

The present application is based on, and claims priority from, Korean Application Serial Numbers 10-2003-0099873, filed on Dec. 30, 2003 and 10-2004-0022017, filed on Mar. 31, 2004, the disclosures of which are hereby incorporated by reference herein in their entirety.

TECHNICAL FIELD OF THE INVENTION

Generally, the present invention relates to a vehicle canister. More particularly, the canister is adapted to reduce leakage of fuel vapor into the atmosphere.

BACKGROUND OF THE INVENTION

Typically, a canister collects fuel vapor evaporated from a fuel tank. The canister also allows the fuel vapor to be burned in a combustion chamber, thereby preventing leakage of the fuel vapor into the atmosphere. The canister typically includes a vent-hole for adjusting the pressure of the fuel tank and purging the collected fuel vapor into the air intake system of the engine. The vent-hole communicates with the atmosphere for allowing air to be taken into the canister from the atmosphere. Accordingly, leakage of fuel vapor from the canister through the vent-hole should effectively be minimized.

SUMMARY OF THE INVENTION

Embodiments of the present invention are provided to minimize leakage of fuel vapor into the atmosphere through a vent-hole of a canister. A canister of a vehicle includes a partition that divides an inner space of a canister into a first space and a second space. The first space communicates with a fuel vapor inlet and a purge outlet. The second space communicates with a vent-hole. A first activated charcoal is packed in the second space near the vent-hole. A second activated charcoal is packed in the first space and a residual space of the second space after packing the second space with the first activated charcoal. The second activated charcoal is inferior in desorption but superior in adsorption compared to the first activated charcoal. An air space is formed between the first activated charcoal and second activated charcoal of the second space. A diffuser is installed in the air space and evenly disperses the flow of gas into the first activated charcoal and second activated charcoal.

BRIEF DESCRIPTION OF THE DRAWINGS

For a better understanding of the nature and objects of the present invention, reference should be made to the following detailed description, read in conjunction with the accompanying drawings, in which.

DETAILED DESCRIPTION OF PREFERRED EMBODIMENTS

Figure 1:
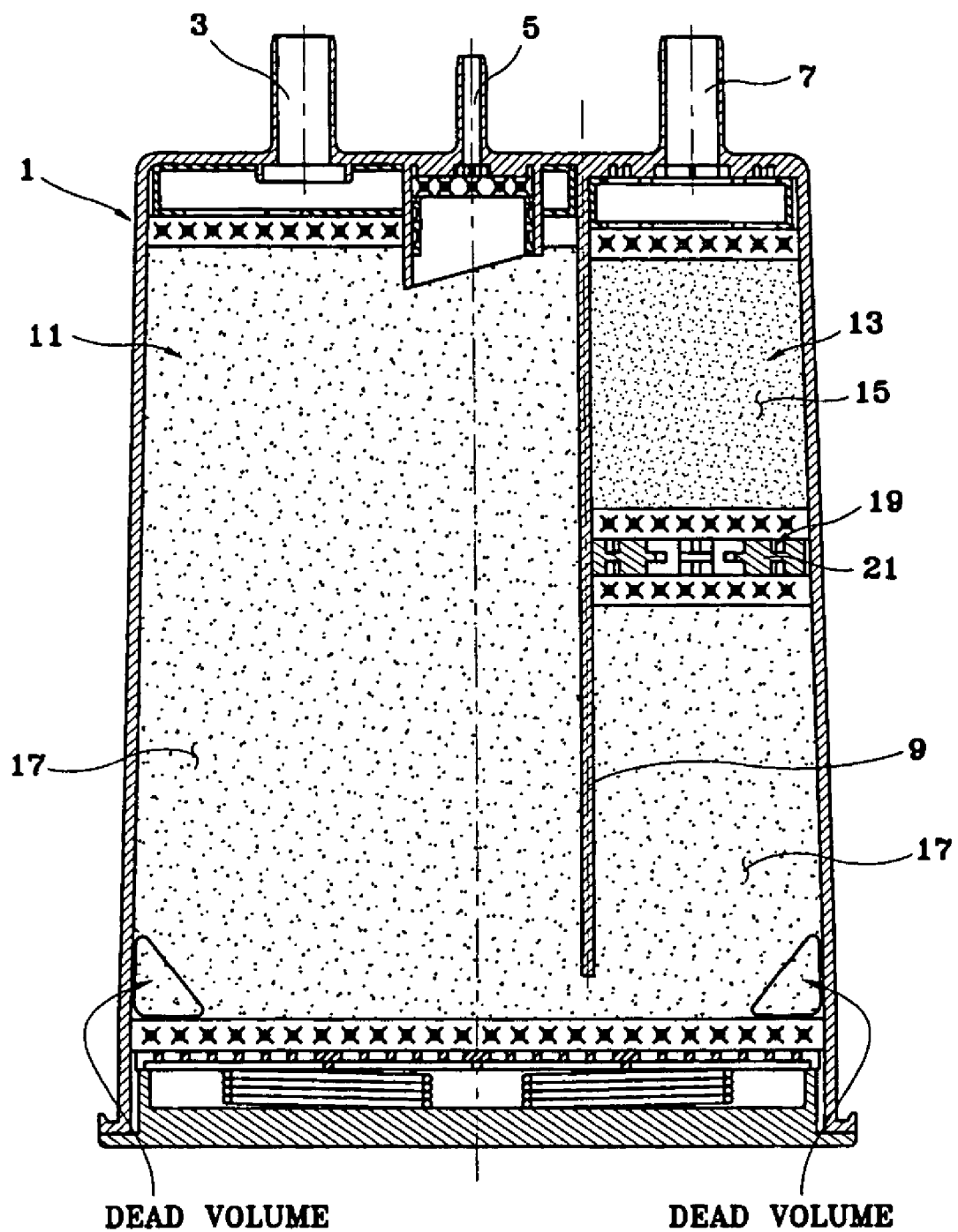
FIG. 1 is a sectional view illustrating an inner structure of a vehicle canister according to an embodiment of the present invention.

Referring to FIG. 1, a canister 1 comprises a fuel vapor inlet 3, purge outlet 5, and vent-hole 7. The fuel vapor inlet 3 allows the fuel vapor to enter into the canister 1 from a fuel tank. The purge outlet 5 purges the collected fuel vapor and the vent-hole 7 is installed to communicate with the atmosphere.

The inner space of the canister 1 is divided into a first space 11 and second space 13 by a partition 9. The first space 11 communicates with the fuel vapor inlet 3 and purge outlet 5 while the second space 13 communicates with the vent-hole 7. The second space 13, near the vent-hole 7, is packed with a first activated charcoal 15. The first space 11 and a residual space of the second space 13, after packing the second space 13 with the first activated charcoal 15, are packed with a second activated charcoal 17. However, second space 13 may be packed with only the first activated charcoal 15. The second activated charcoal 17 is superior in adsorption but inferior in desorption compared to the first activated charcoal 15.

As the first activated charcoal 15 is superior to the second activated charcoal 17 in the regeneration function (i.e., desorption), when an equivalent amount of air intake is applied, a residual amount of fuel vapor is formed less in the first activated charcoal 15 during a purge compared to the second activated charcoal 17.

An air space 19 is formed between the first activated charcoal 15 and second activated charcoal 17 of the second space 13. The air space 19 is provided with a diffuser 21 for evenly dispersing the flow of gas into the first and second activated charcoals 15 and 17, respectively.

Figure 2:
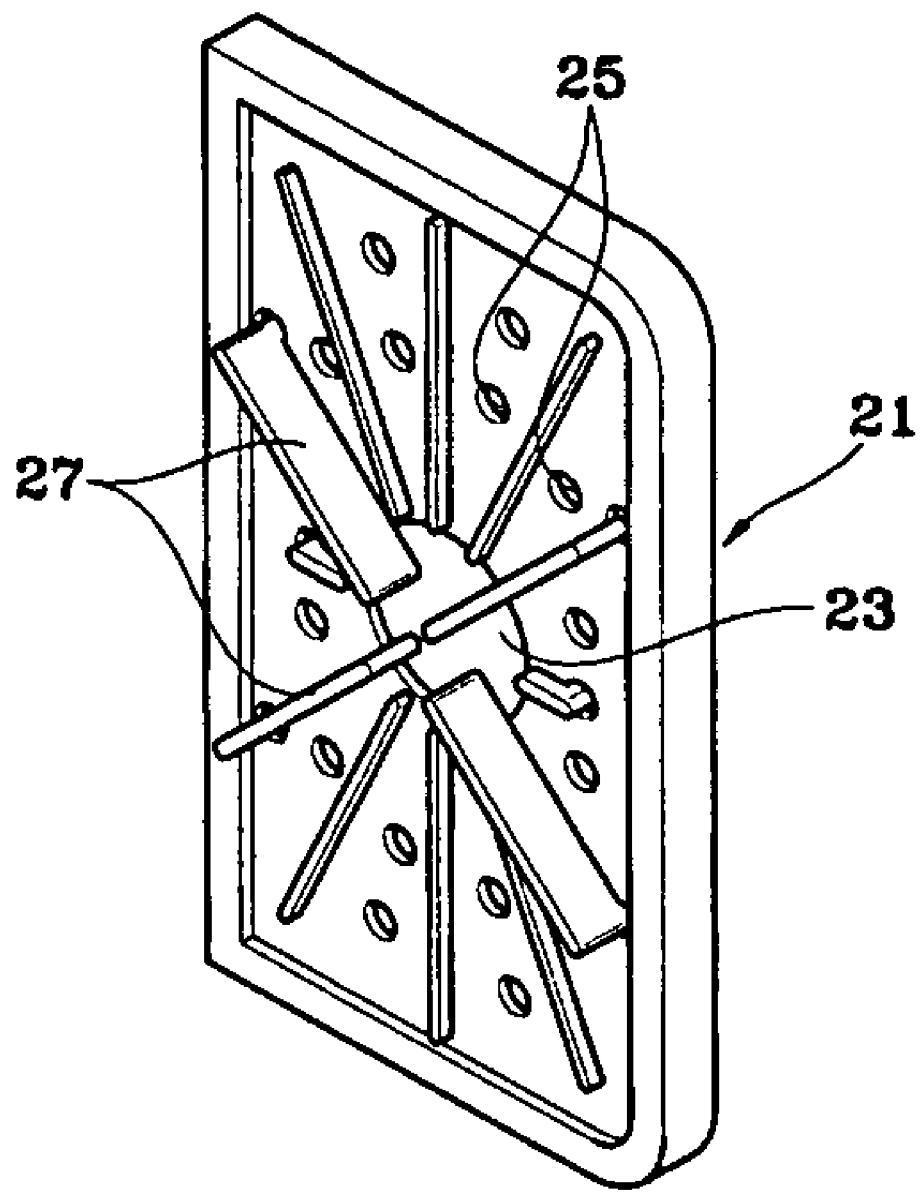
FIG. 2 depicts a diffuser installed in a canister according to an embodiment of the present invention.

As shown in FIG. 2, the diffuser 21 includes at least one main hole 23 formed at a center portion of the diffuser 21. A plurality of subsidiary holes 25 having a smaller size than that of the main hole 23 are formed around the main hole 23. A plurality of ribs 27 obtains a space and guides the flow of gas.

With reference to FIG. 1, one diffuser 21 is equipped at the air space 19 in an embodiment of the present invention, and a space containing the diffuser 21 constitutes the air space. The air space 19 is preferably formed or positioned within a ¼-½ range of the overall length of the second space 13 from the vent-hole 7.

The operation of the present invention will now be described in detail. When filling up the fuel tank with fuel, the fuel vapor enters into the canister 1 through the fuel vapor inlet 3. The fuel vapor passes through the second activated charcoal 17 and first activated charcoal 15, consecutively, and is adsorbed therein such that only the air ingredients are discharged to the atmosphere via the vent-hole 7. The air space 19 and diffuser 21 installed inside the air space 19 evenly disperse gas to the first activated charcoal 15, wherein the gas flows from the second activated charcoal 17 toward the first activated charcoal 15, optimizing the efficiency of the first activated charcoal 15.

Under a normal state (i.e., fuel tank is not being filled up with fuel), the fuel vapor generated from the fuel tank is collected in the second activated charcoal 17 and first activated charcoal 15 and is prevented from being discharged to the atmosphere. If the operation state of the engine is appropriate for purging the canister 1, a Purge Control Solenoid Valve (PCSV) is activated to purge the fuel vapor inside the canister 1 via the purge outlet 5. At this time, air enters into the canister 1 via the vent-hole 7.

The air entered into the canister 1 desorbs the fuel vapor that has been collected in the first activated charcoal 15 and second activated charcoal 17. Thereafter, the fuel vapor flows into the engine air intake system, thus the first activated charcoal 15 and second activated charcoal 17 are regenerated. The air space 19 and diffuser 21 installed in the air space 19 optimize the desorption operation and regeneration of the second activated charcoal 17 by evenly providing air into the second activated charcoal 17.

The first activated charcoal 15 is relatively inferior to the second activated charcoal 17 in adsorption, however, superior in desorption, thereby resulting in a rapid and effective regeneration. While the canister 1 is not in a purging state, the fuel vapor among gas escaping toward the vent-hole 7 can sufficiently be adsorbed in the charcoals. As a result, leakage of the fuel vapor from the canister 1 to the exterior can maximally be reduced.

Figure 3:
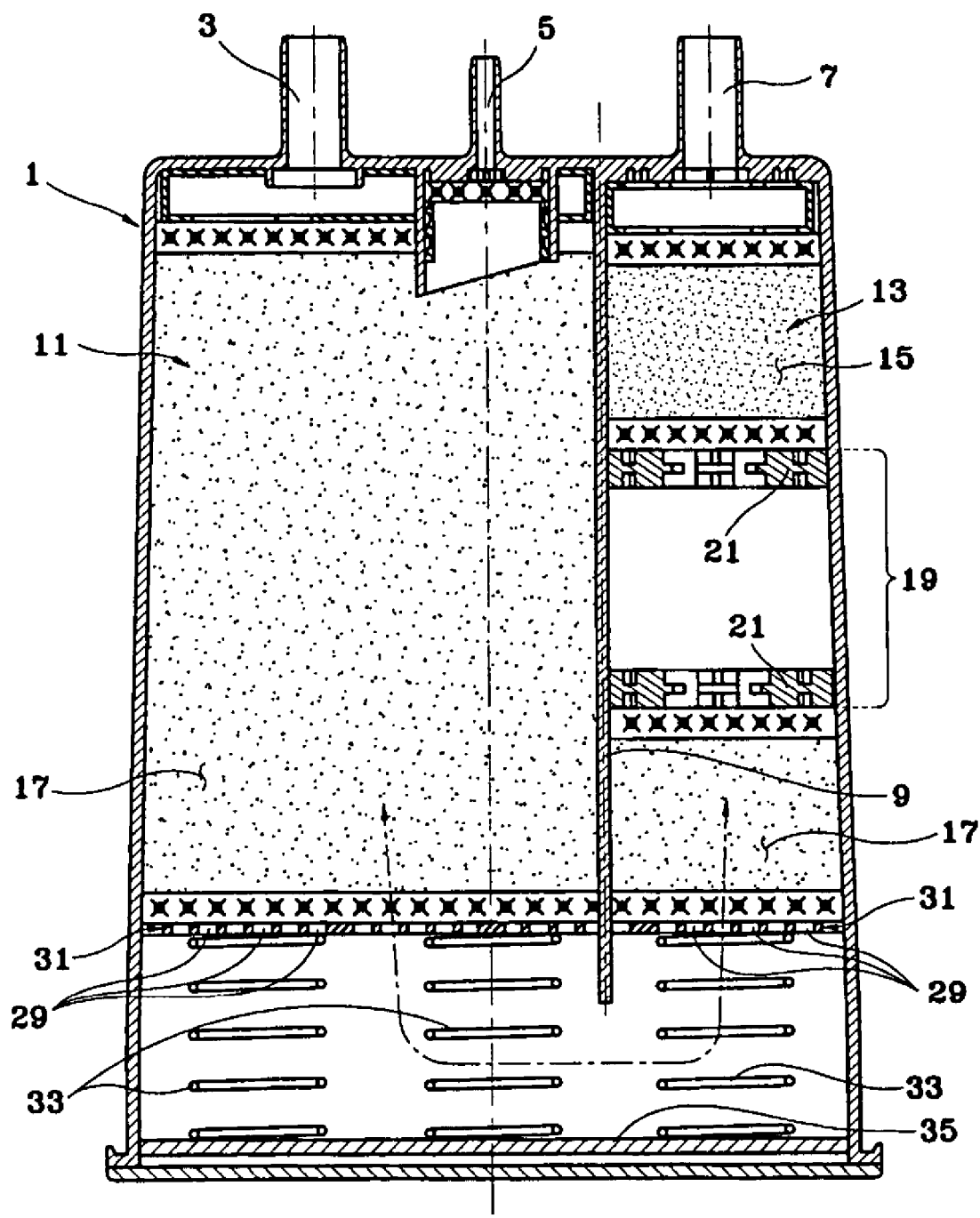
FIG. 3 is a sectional view of a canister according to another embodiment of the present invention.

FIG. 3 illustrates another embodiment of the air space and lower side of the canister 1. Hereinafter, only the different configurations from the above first embodiment of the present invention will be explained.

As shown in FIG. 3, two diffusers 21 are disposed at a top and bottom of the air space 19 formed in the second space 13 for being separated from each other. A space containing the two diffusers 21 as well as a space between the two diffusers 21 form the air space 19, thereby enlarging the volume of the air space 19.

The enlarged air space 19 allows gas passing through the air space 19 to generate a nonlinear movement when penetrating the main hole 23 and the plurality of subsidiary holes 25 of the diffuser 21. Thus, the gas becomes a homogeneous state, resulting in an effective operation of the first and second activated charcoals 15 and 17. If the two diffuser 21 are placed distant to each other as described above, the air space 19 is preferably positioned or formed within a ⅓-⅔ range of the overall length of the second space 13 from the vent-hole 7.

Referring to the lower portion of FIG. 3, a support plate 31 is installed opposite of the fuel vapor inlet 3, purge outlet 5, and vent-hole 7. The support plate 31, through which the partition 9 passes, supports the second activated charcoal 17 and is formed with a plurality of through holes 29. A plurality of support springs 33 supports the bottom of the support plate 31. A spring supporting plate 35 supports the bottom of the support spring 33. For example, three springs may be installed to evenly support the support plate as shown in FIG. 3.

A lower distal end of the partition 9 penetrates into the support plate 31 and is placed at a space between the support plate 31 and spring supporting plate 35. Compared to the embodiment of FIG. 1, the support plate 31 is raised from the bottom of the canister 1. Therefore, the partition 9 penetrates into the support plate 31 and the lower end portion of the partition 9 is disposed between the support plate 31 and spring supporting plate 35. Both lower corner portions of the canister 1 in FIG. 1 are formed with a dead volume. The dead volume refers to a space where gas moving in the canister 1 does not pass therethrough. However, the embodiment depicted in FIG. 3 provides a canister structure without any dead volume. That is, the disposition of the support plate 31 is relatively raised, and the dead volume and the space around the dead volume are eliminated to reduce the amount of activated charcoal used therein. Furthermore, the gas passes through the lower side of the support plate 31 for bypassing the partition 9, increasing the moving area of the gas, evenly distributing the gas to the activated charcoal, and resulting in an effective adsorption or desorption of gas within the canister 1.

Figure 4:
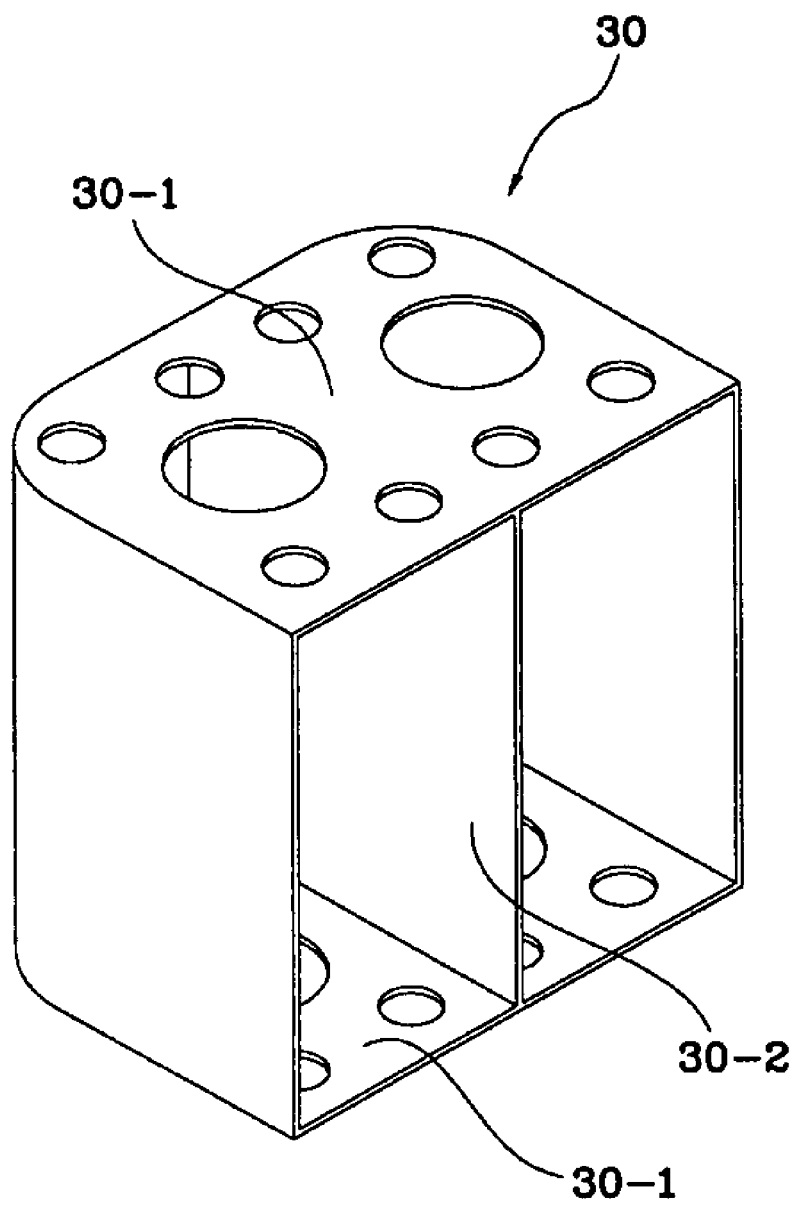
FIG. 4 illustrates an embodiment of an air container according to an embodiment of the present invention.

According to yet another embodiment, an air container 30, as illustrated in FIG. 4 may preferably be provided in the air space 19. The air container 30 includes a plurality of diffusers 30-1 (two diffusers on the top and bottom in the present invention). A space is formed between the diffusers 30-1, and a reinforcing plate 30-2 connects and supports the diffusers 30-1 therebetween. The air container 30 is prevented from being deformed by the reinforcing plate 30-2. The air container 30 is configured for durability purposes and for improving the assembly of the canister 1.

If the first activated charcoal 15 and/or second activated charcoal 17 packed in the second space 13 is reduced in volume by a crack or the like generated by aging, the support plate 31 and air container 30 apply an appropriate pressure to the first activated charcoal 15 and/or second activated charcoal 17 packed in the second space 13 via the force of the support spring 33, resulting in an elimination of the crack of the activated charcoal and maintenance of proper density. In order for the support plate 31 to apply appropriate pressure to the activated charcoals packed inside the second space 13 except the activated charcoals packed in the first space 11, the support plate 31 should be divided into certain sections in relation to the partition 9.

As apparent from the foregoing, there is an advantage in the present invention in that two types of activated charcoals having different adsorption and desorption functions are properly disposed in the canister, and the gas movement is evenly dispersed via the air space and diffuser equipped between the two activated charcoals. Thereby, leakage of fuel vapor from the canister to the atmosphere is minimized without a supplementary component, i.e., a subsidiary canister or the like, and reducing the consumption amount of the activated charcoal by elimination of the dead volume.

What is claimed is:

1. A canister of a vehicle, comprising:
   a partition dividing the inner space of a canister into a first space and a second space, said first space communicating with an fuel vapor inlet and a purge outlet, and said second space communicating with a vent-hole:
   a first activated charcoal packed in said second space near said vent-hole:
   a second activated charcoal packed in said first space and a residual space of said second space after packing said second space with said first activated charcoal:
   wherein an air space is formed between said first activated charcoal and said second activated charcoal of said second space, wherein said air space is formed in said second space and positioned not less than about ⅓and not more than about ⅔range of the overall length of said second space from said vent-hole: and
   a diffuser installed in between said first activated charcoal and said second activated charcoal for evenly dispersing the flow of gas into said first activated charcoal and said second activated charcoal:
   wherein two diffusers are equipped at a top and bottom side of said air space for being separated from each other.

2. A canister of a vehicle, comprising:
   a partition dividing the inner space of a canister into a first space and a second space, said first space communicating with an fuel vapor inlet and a purge outlet, and said second space communicating with a vent-hole:
   a first activated charcoal packed in said second space near said vent-hole:

a second activated charcoal packed in said first space and a residual space of said second space after packing said second space with said first activated charcoal:

wherein an air space is formed between said first activated charcoal and said second activated charcoal of said second space: and a diffuser installed in between said first activated charcoal and said second activated charcoal for evenly dispersing the flow of gas into said first activated charcoal and said second activated charcoal:

wherein said air space includes an air container having a plurality of diffusers and a space between said diffusers.

3. The canister as defined in claim 2, wherein said air container is further equipped with a reinforcing plate for connecting and supporting said diffusers therebetween.

4. A canister of a vehicle, comprising:

a partition dividing an inner space of a canister into a first space and a second space, said first space communicating with a fuel vapor inlet and a purge outlet, and said second space communicating with a vent-hole:

a first activated charcoal packed in said second space:

a second activated charcoal packed in said first space: and a diffuser installed between said first activated charcoal and said second activated charcoal for evenly dispersing the flow of gas into said first activated charcoal:

wherein two diffusers are equipped at a top and bottom side of said air space for being separated from each other.

5. A canister of a vehicle, comprising:

a partition dividing an inner space of a canister into a first space and a second space, said first space communicating with a fuel vapor inlet and a purge outlet, and said second space communicating with a vent-hole:

a first activated charcoal packed in said second space:

a second activated charcoal packed in said first space:

a diffuser installed between said first activated charcoal and said second activated charcoal for evenly dispersing the flow of gas into said first activated: and an air space formed between said first activated charcoal of said second space. wherein said air space includes an air container having a plurality of diffusers and a space between said diffusers.

6. The canister as defined in claim 5, wherein said air container is further equipped with a reinforcing plate for connecting and supporting said diffusers therebetween.

* * * * *